US008265059B1

United States Patent
Arad

(10) Patent No.: US 8,265,059 B1
(45) Date of Patent: *Sep. 11, 2012

(54) ADDRESS SCOPE CHECKING FOR INTERNET PROTOCOL VERSION 6

(75) Inventor: Nir Arad, Haifa (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 65 days.

This patent is subject to a terminal disclaimer.

(21) Appl. No.: 12/686,752

(22) Filed: Jan. 13, 2010

Related U.S. Application Data

(63) Continuation of application No. 11/188,828, filed on Jul. 25, 2005, now Pat. No. 7,653,044.

(60) Provisional application No. 60/669,456, filed on Apr. 7, 2005, provisional application No. 60/693,973, filed on Jun. 24, 2005.

(51) Int. Cl.
| H04L 12/54 | (2006.01) |
| H04L 12/66 | (2006.01) |
| G06F 15/16 | (2006.01) |
| G06F 15/173 | (2006.01) |

(52) U.S. Cl. ............... 370/351; 370/392; 370/395.31; 370/395.52; 370/401; 370/428; 709/230; 709/238

(58) Field of Classification Search ............ 370/351, 370/392, 395.31, 395.52, 401, 428; 709/230, 709/238
See application file for complete search history.

(56) References Cited

U.S. PATENT DOCUMENTS

| 6,119,171 | A * | 9/2000 | Alkhatib ............... 709/245 |
| 6,215,766 | B1 * | 4/2001 | Ammar et al. ......... 370/229 |
| 6,243,758 | B1 | 6/2001 | Okanoue |
| 6,430,623 | B1 * | 8/2002 | Alkhatib ............... 709/245 |
| 6,611,872 | B1 * | 8/2003 | McCanne ............. 709/238 |
| 6,772,227 | B2 * | 8/2004 | Alkhatib ............... 709/245 |
| 6,775,258 | B1 | 8/2004 | Van Valkenburg et al. |
| 6,798,773 | B2 | 9/2004 | Trossen et al. |
| 7,069,312 | B2 * | 6/2006 | Kostic et al. ........... 709/220 |
| 7,080,157 | B2 * | 7/2006 | McCanne ............. 709/238 |
| 7,095,738 | B1 | 8/2006 | Desanti |
| 7,133,928 | B2 * | 11/2006 | McCanne ............. 709/238 |
| 7,180,887 | B1 | 2/2007 | Schwaderer et al. |
| 7,359,380 | B1 | 4/2008 | Maufer et al. |
| 7,367,052 | B1 | 4/2008 | Desanti |
| 7,380,021 | B2 * | 5/2008 | Boden .................. 709/245 |
| 7,400,645 | B2 | 7/2008 | Tsuchiya et al. |
| 7,400,646 | B2 | 7/2008 | Tsuchiya et al. |
| 7,447,203 | B2 | 11/2008 | Chen et al. |
| 7,466,703 | B1 | 12/2008 | Arunachalam et al. |
| 7,467,214 | B2 * | 12/2008 | Chin ..................... 709/230 |
| 7,499,450 | B2 | 3/2009 | Foglar et al. |
| 7,526,562 | B1 | 4/2009 | Samprathi et al. |
| 7,602,781 | B2 * | 10/2009 | Desanti ................. 370/389 |
| 7,609,689 | B1 * | 10/2009 | Desanti et al. ........ 370/389 |
| 7,650,424 | B2 * | 1/2010 | Armitage ............. 709/238 |
| 7,734,745 | B2 * | 6/2010 | Gloe .................... 709/223 |
| 7,894,428 | B2 * | 2/2011 | Yamane ................ 370/389 |
| 8,090,805 | B1 * | 1/2012 | Chawla et al. ........ 709/221 |
| 2001/0040895 | A1 * | 11/2001 | Templin ............... 370/466 |

(Continued)

*Primary Examiner* — Alpus H Hsu

(57) ABSTRACT

An apparatus includes a plurality of ports to receive a packet. A scope circuit determines a source scope level for a source Internet protocol version 6 (IPv6) address of the received packet. A command circuit determines whether to forward the received packet based on the source scope level. The source scope level is indicative of whether a source address is a global address or a local address.

20 Claims, 4 Drawing Sheets

U.S. PATENT DOCUMENTS

| | | | |
|---|---|---|---|
| 2002/0150094 A1* | 10/2002 | Cheng et al. | 370/389 |
| 2004/0162914 A1 | 8/2004 | St. Pierre et al. | |
| 2004/0205215 A1 | 10/2004 | Kouvelas et al. | |
| 2004/0233907 A1* | 11/2004 | Hundscheidt et al. | 370/390 |
| 2004/0264474 A1* | 12/2004 | Sbida | 370/395.5 |
| 2005/0044141 A1 | 2/2005 | Hameleers et al. | |

* cited by examiner

ADDRESS SCOPE CHECKING FOR INTERNET PROTOCOL VERSION 6

CROSS-REFERENCE TO RELATED APPLICATIONS

This application is a continuation of U.S. patent application Ser. No. 11/188,828, filed Jul. 25, 2005, which claims the benefit of U.S. Provisional Patent Application No. 60/669,456, filed Apr. 7, 2005, and U.S. Provisional Patent Application No. 60/693,973, filed Jun. 24, 2005, the disclosures thereof incorporated by reference herein in their entirety.

BACKGROUND

The present invention relates generally to data communications. More particularly, the present invention relates to address scope checking for Internet protocol version 6 (IPv6).

SUMMARY

In general, in one aspect, the invention features an apparatus comprising: a plurality of ports to receive packets each associated with a source Internet protocol version 6 (IPv6) address and a destination IPv6 address; a site circuit to determine a source site for the source IPv6 address, and a destination site for the destination IPv6 address, associated with each of the packets; a scope circuit to determine a source scope level for the source IPv6 address, and a destination scope level for the destination IPv6 address, associated with each of the packets; a command circuit to select one of a plurality of actions for each of the packets based on the source site and source scope level for the source IPv6 address associated with the packet and the destination site and destination scope level for the destination IPv6 address associated with the packet; wherein the plurality of actions comprises forwarding the packet according to the destination IPv6 address associated with the packet, and dropping the packet.

Some embodiments comprise a memory to store a table relating combinations of the source sites, the source scope levels, the destination sites and the destination scope levels to the actions; wherein the command circuit selects the one of a plurality of actions based on the table. Some embodiments comprise a memory to store a next hop-table comprising a plurality of linked lists of next-hop entries each comprising a plurality of global next-hop entries and a plurality of site-local next hop entries, wherein a last one of the global next-hop entries is linked to a first one of the site-local next-hop entries, and a multicast routing table comprising a plurality of entries each associating an IPv6 multicast address with a site-local pointer to a first one of the site-local next-hop entries in one of the linked lists, and a global pointer point to a first one of the global next-hop entries in the one of the linked lists; wherein the command circuit forwards packets having IPv6 multicast addresses according to the associated site-local pointer when the source scope for the associated source IPv6 address is site-local, and according to the associated global pointer when the source scope for the associated source IPv6 address is global. Some embodiments comprise a forwarding engine to execute the one of the plurality of actions selected by the command circuit. In some embodiments, the site circuit determines a source site for each of the packets based on at least one of the identity of the one of the ports that received the packet, and a source virtual local area network (VLAN) of the packet. In some embodiments, the site circuit determines the destination site based on a next hop entry associated with the destination IPv6 address. In some embodiments, each of the IPv6 addresses comprises a prefix; and wherein the scope circuit determines the source scope levels for the IPv6 addresses based on the respective prefixes of the respective IPv6 addresses. In some embodiments, each of the IPv6 addresses comprises a prefix; and wherein the destination scope levels for unicast ones of the destination IPv6 addresses are determined based on the respective prefixes of the respective destination IPv6 addresses. In some embodiments, the destination scope levels for multicast ones of the destination IPv6 addresses are determined based on next hop entries associated with the respective destination IPv6 addresses. In some embodiments, the command circuit selects the action of forwarding one of the packets according to the destination IPv6 address associated with the one of the packets when the source scope level associated with the source IPv6 address of the one of the packets is global. In some embodiments, the command circuit selects the action of dropping one of the packets when the source scope level of the source IPv6 address associated with the one of the packets is site-local, the destination scope level of the destination IPv6 address associated with the one of the packets is global, and the source site of the source IPv6 address associated with the one of the packets is not the same as the destination site of the destination IPv6 address associated with the one of the packets. In some embodiments, a router comprises the apparatus.

In general, in one aspect, the invention features an apparatus comprising: a plurality of port means for receiving packets each associated with a source Internet protocol version 6 (IPv6) address and a destination IPv6 address; site means for determining a source site for the source IPv6 address, and a destination site for the destination IPv6 address, associated with each of the packets; scope means for determining a source scope level for the source IPv6 address, and a destination scope level for the destination IPv6 address, associated with each of the packets; command means for selecting one of a plurality of actions for each of the packets based on the source site and source scope level for the source IPv6 address associated with the packet and the destination site and destination scope level for the destination IPv6 address associated with the packet; wherein the plurality of actions comprises forwarding the packet according to the destination IPv6 address associated with the packet, and dropping the packet.

In some embodiments, means for storing a table relating combinations of the source sites, the source scope levels, the destination sites and the destination scope levels to the actions; wherein the command means selects the one of a plurality of actions based on the table. In some embodiments, means for storing a next hop-table comprising a plurality of linked lists of next-hop entries each comprising a plurality of global next-hop entries and a plurality of site-local next hop entries, wherein a last one of the global next-hop entries is linked to a first one of the site-local next-hop entries, and a multicast routing table comprising a plurality of entries each associating an IPv6 multicast address with a site-local pointer to a first one of the site-local next-hop entries in one of the linked lists, and a global pointer point to a first one of the global next-hop entries in the one of the linked lists; wherein the command means forwards packets having IPv6 multicast addresses according to the associated site-local pointer when the source scope for the associated source IPv6 address is site-local, and according to the associated global pointer when the source scope for the associated source IPv6 address is global. Some embodiments comprise forwarding means for executing the one of the plurality of actions selected by the command means. In some embodiments, the site means determines a source site for each of the packets based on at least one of the identity of the one of the port means that received the packet, and a source virtual local area network (VLAN) of the packet. In some embodiments, the site means determines the destination site based on a next hop entry associated with the destination IPv6 address. In some embodiments, each of the IPv6 addresses comprises a prefix; and wherein the scope means determines the source scope levels for the IPv6 addresses based on the respective prefixes of the respective IPv6 addresses. In some embodiments, wherein each of the IPv6 addresses comprises a prefix; and wherein the destination scope levels for unicast ones of the destination IPv6 addresses are determined based on the respective prefixes of the respective destination IPv6 addresses. In some embodiments, the destination scope levels for multicast ones of the destination IPv6 addresses are determined based on next hop entries associated with the respective destination IPv6 addresses. In some embodiments, the command means selects the action of forwarding one of the packets according to the destination IPv6 address associated with the one of the packets when the source scope level associated with the source IPv6 address of the one of the packets is global. In some embodiments, the command means selects the action of dropping one of the packets when the source scope level of the source IPv6 address associated with the one of the packets is site-local, the destination scope level of the destination IPv6 address associated with the one of the packets is global, and the source site of the source IPv6 address associated with the one of the packets is not the same as the destination site of the destination IPv6 address associated with the one of the packets. In some embodiments, a router comprises the apparatus.

In general, in one aspect, the invention features a method comprising: receiving packets each associated with a source Internet protocol version 6 (IPv6) address and a destination IPv6 address; determining a source site for the source IPv6 address, and a destination site for the destination IPv6 address, associated with each of the packets; determining a source scope level for the source IPv6 address, and a destination scope level for the destination IPv6 address, associated with each of the packets; selecting one of a plurality of actions for each of the packets based on the source site and source scope level for the source IPv6 address associated with the packet and the destination site and destination scope level for the destination IPv6 address associated with the packet; wherein the plurality of actions comprises forwarding the packet according to the destination IPv6 address associated with the packet, and dropping the packet.

Some embodiments comprise storing a table relating combinations of the source sites, the source scope levels, the destination sites and the destination scope levels to the actions; wherein the one of a plurality of actions is selected based on the table. Some embodiments comprise storing a next hop-table comprising a plurality of linked lists of next-hop entries each comprising a plurality of global next-hop entries and a plurality of site-local next hop entries, wherein a last one of the global next-hop entries is linked to a first one of the site-local next-hop entries, and a multicast routing table comprising a plurality of entries each associating an IPv6 multicast address with a site-local pointer to a first one of the site-local next-hop entries in one of the linked lists, and a global pointer point to a first one of the global next-hop entries in the one of the linked lists; wherein packets having IPv6 multicast addresses are forwarded according to the associated site-local pointer when the source scope for the associated source IPv6 address is site-local, and according to the associated global pointer when the source scope for the associated source IPv6 address is global. Some embodiments comprise executing the selected one of the plurality of actions. In some embodiments, a source site for each of the packets is determined based on at least one of an identity of a port that received the packet, and a source virtual local area network (VLAN) of the packet. In some embodiments, the destination site is determined based on a next hop entry associated with the destination IPv6 address. In some embodiments, each of the IPv6 addresses comprises a prefix; and wherein the source scope levels for the IPv6 addresses are determined based on the respective prefixes of the respective IPv6 addresses. In some embodiments, each of the IPv6 addresses comprises a prefix; and wherein the destination scope levels for unicast ones of the destination IPv6 addresses are determined based on the respective prefixes of the respective destination IPv6 addresses. In some embodiments, the destination scope levels for multicast ones of the destination IPv6 addresses are determined based on next hop entries associated with the respective destination IPv6 addresses. In some embodiments, the action of forwarding one of the packets according to the destination IPv6 address associated with the one of the packets is selected when the source scope level for the source IPv6 address associated with the one of the packets is global. In some embodiments, the action of dropping one of the packets is selected when the source scope level of the source IPv6 address associated with the one of the packets is site-local, the destination scope level of the destination IPv6 address associated with the one of the packets is global, and the source site of the source IPv6 address associated with the one of the packets is not the same as the destination site of the destination IPv6 address associated with the one of the packets.

In general, in one aspect, the invention features a computer program comprising: receiving packets each associated with a source Internet protocol version 6 (IPv6) address and a destination IPv6 address; determining a source site for the source IPv6 address, and a destination site for the destination IPv6 address, associated with each of the packets; determining a source scope level for the source IPv6 address, and a destination scope level for the destination IPv6 address, associated with each of the packets; selecting one of a plurality of actions for each of the packets based on the source site and source scope level for the source IPv6 address associated with the packet and the destination site and destination scope level for the destination IPv6 address associated with the packet; wherein the plurality of actions comprises forwarding the packet according to the destination IPv6 address associated with the packet, and dropping the packet.

Some embodiments comprise storing a table relating combinations of the source sites, the source scope levels, the destination sites and the destination scope levels to the actions; wherein the one of a plurality of actions is selected based on the table. Some embodiments comprise storing a next hop-table comprising a plurality of linked lists of next-hop entries each comprising a plurality of global next-hop entries and a plurality of site-local next hop entries, wherein a last one of the global next-hop entries is linked to a first one of the site-local next-hop entries, and a multicast routing table comprising a plurality of entries each associating an IPv6 multicast address with a site-local pointer to a first one of the site-local next-hop entries in one of the linked lists, and a global pointer point to a first one of the global next-hop entries in the one of the linked lists; wherein packets having IPv6 multicast addresses are forwarded according to the associated site-local pointer when the source scope for the associated source IPv6 address is site-local, and according to the associated global pointer when the source scope for the associated source IPv6 address is global. Some embodiments comprise executing the selected one of the plurality of actions. In some embodiments, a source site for each of the packets is determined based on at least one of an identity of a port that received the packet, and a source virtual local area network (VLAN) of the packet. In some embodiments, the destination site is determined based on a next hop entry associated with the destination IPv6 address. In some embodiments, each of the IPv6 addresses comprises a prefix; and wherein the source scope levels for the IPv6 addresses are determined based on the respective prefixes of the respective IPv6 addresses. In some embodiments, each of the IPv6 addresses comprises a prefix; and wherein the destination scope levels for unicast ones of the destination IPv6 addresses are determined based on the respective prefixes of the respective destination IPv6 addresses. In some embodiments, the destination scope levels for multicast ones of the destination IPv6 addresses are determined based on next hop entries associated with the respective destination IPv6 addresses. In some embodiments, the action of forwarding one of the packets according to the destination IPv6 address associated with the one of the packets is selected when the source scope level for the source IPv6 address associated with the one of the packets is global. In some embodiments, the action of dropping one of the packets is selected when the source scope level of the source IPv6 address associated with the one of the packets is site-local, the destination scope level of the destination IPv6 address associated with the one of the packets is global, and the source site of the source IPv6 address associated with the one of the packets is not the same as the destination site of the destination IPv6 address associated with the one of the packets.

The details of one or more implementations are set forth in the accompanying drawings and the description below. Other features will be apparent from the description and drawings, and from the claims.

Figure 1:
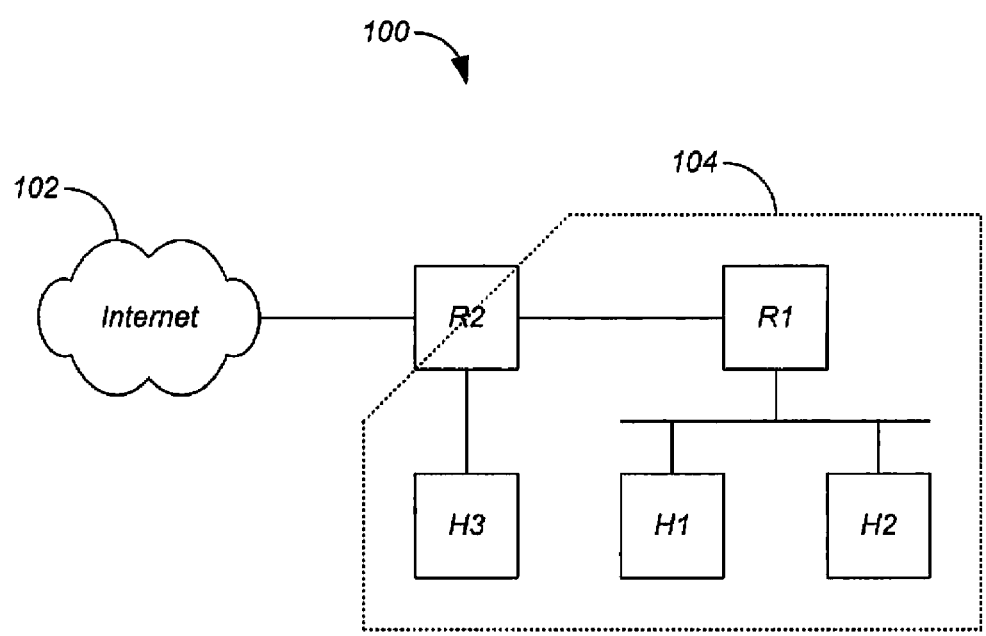
FIG. 1 shows an exemplary network topology using IPv6 as a communications protocol.

The leading digit(s) of each reference numeral used in this specification indicates the number of the drawing in which the reference numeral first appears.

DETAILED DESCRIPTION

Internet protocol version 6 (IPv6) is the next-generation protocol for the Internet, replacing the existing IPv4 protocol, and providing a significantly larger address space. FIG. 1 shows an exemplary network topology 100 using IPv6 as a communications protocol. Network 100 comprises a site 104 connected to Internet 102. Site 104 comprises hosts H1, H2, and H3, and routers R1 and R2. Hosts H1 and H2 are connected to router R1. Host H3 is connected to router R2, which is connected to router R1 and Internet 102.

According to IPv6, each interface of each network node must be assigned an IPv6 address for use in communicating with other IPv6-enabled nodes. IPv6 defines addresses having global scope and site-local scope. A global scope address is unique in the Internet. A site-local scope address is unique only within a particular site 104. Therefore packets having a site-local scope source or destination address cannot be forwarded beyond the site 104. For example, referring to FIG. 1, host H1 may send a packet to host H3 by using the site-local addresses for hosts H1 and H3 as the source and destination addresses for the packet. However, router R2 must ensure that the packet is not forwarded to Internet 102. To send a packet to Internet 102, host H1 must use a global address for host H1 as the source address of the packet. Routers such as router R2 must ensure that packets having site-local scope source addresses are not forwarded beyond the site 104.

Embodiments of the present invention ensure that network devices such as routers enforce these and other rules when handling IPv6 addressed packets. Preferably these rules are table-based, allowing flexible configuration to accommodate expansion, new address architectures, and the like.

Figure 2:
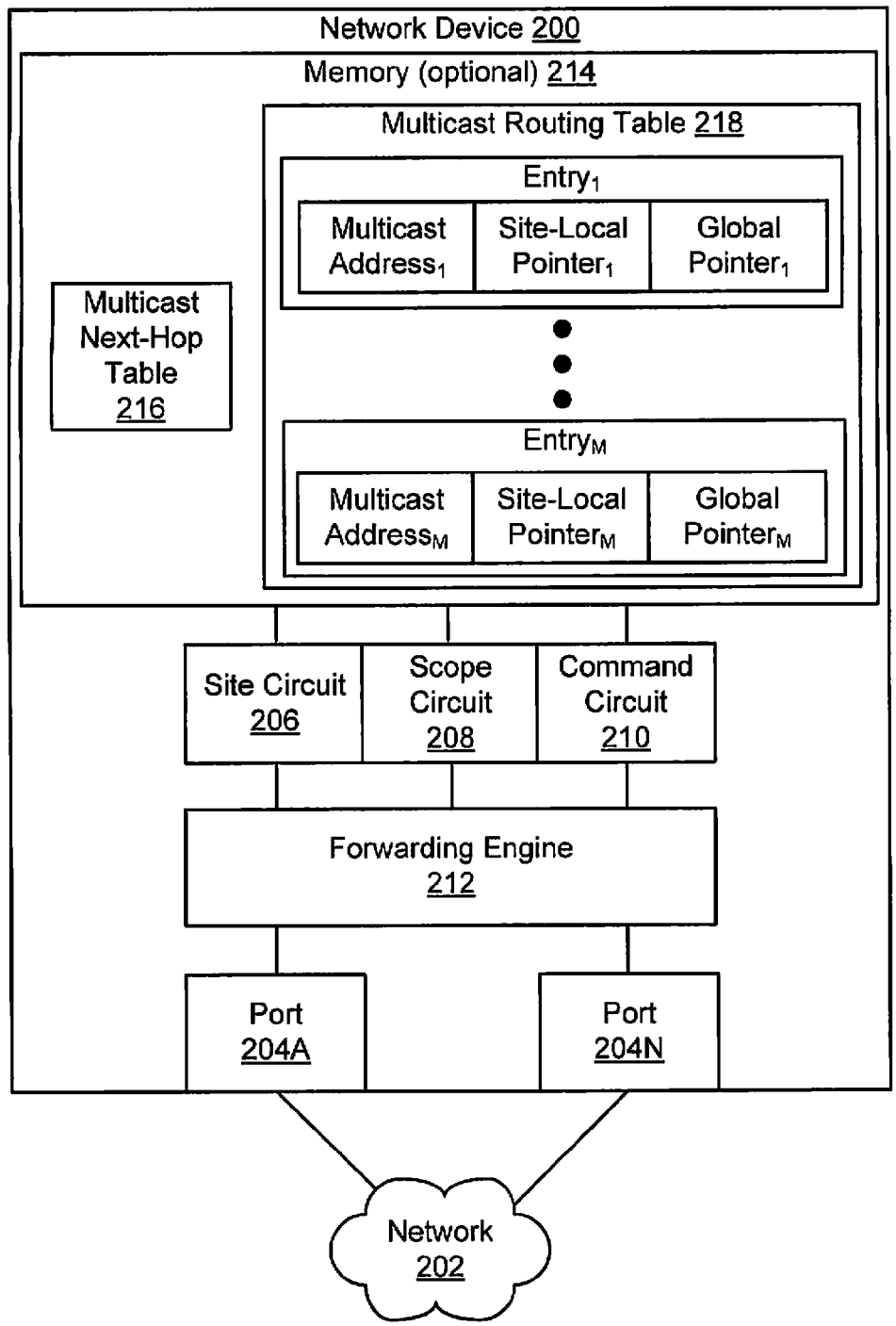
FIG. 2 shows a network device connected to a network that complies with IPv6 according to a preferred embodiment of the present invention.

FIG. 2 shows a network device 200 connected to a network 202 that complies with IPv6 according to a preferred embodiment of the present invention. Network device 200 is preferably implemented as a router, although other embodiments are contemplated. Network device 200 comprises a plurality of ports 204A-N to exchange IPv6 packets of data with network 202, which preferably comprises a plurality of networks including the Internet; a site circuit 206 to determine a source site for the source IPv6 address, and a destination site for each of the destination IPv6 addresses, associated with each of the packets; a scope circuit 208 to determine a source scope level for the source IPv6 address, and a destination scope level for the destination IPv6 address, associated with each of the packets; a command circuit 210 to select one of a plurality of actions for each of the packets based on the source site and source scope level associated with the source IPv6 address associated with the packet and the destination site and destination scope level for the destination IPv6 address associated with the packet; and a forwarding engine 212 to transfer the packets between ports 204 according to the actions selected by command circuit 210. In some embodiments, one or more of the elements of network device 200 is implemented as a processor. Network device 200 also preferably comprises an optional memory 214 for storing one or more tables for use by other elements of network device 200, as described in detail below.

Figure 3:
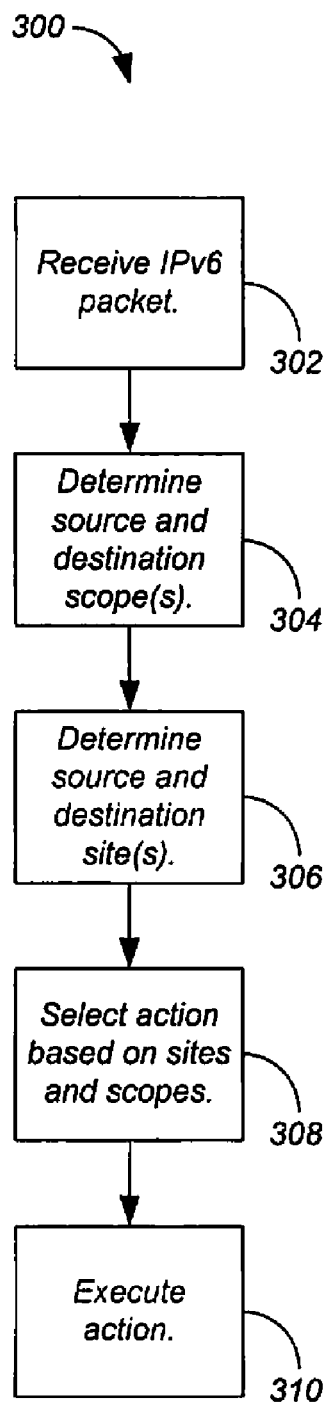
FIG. 3 shows a process for the network device of FIG. 2 according to a preferred embodiment of the present invention.

FIG. 3 shows a process 300 for network device 200 according to a preferred embodiment of the present invention. A port 204 receives a packet associated with a source Internet protocol version 6 (IPv6) address and one or more destination IPv6 addresses (step 302).

Scope circuit 208 determines a source scope level for the source IPv6 address, and a destination scope level for the destination IPv6 address, associated with the packet (step 304). Each IPv6 address comprises a prefix, as is well-known in the relevant arts. For unicast IPv6 addresses, scope circuit 208 preferably determines the source and destination scope levels based on the prefixes of the respective IPv6 addresses. Preferably memory 214 stores a table of prefixes such as Table 1 below.

TABLE 1

| Prefix | Mask | Address scope |
|--------|------|---------------|
| FE80 | FFC0 | Link-local (0) |
| FEC0 | FFC0 | Site-local (1) |
| FC00 | FE00 | Unique-local (2) |
| Reserved | Reserved | N/A |

The table of prefixes can include reserved locations, as shown in Table 1, and is configurable to accommodate future expansion and changes in the address architecture of network 202.

For multicast IPv6 addresses, scope circuit 208 preferably determines the source scope level based on the prefix of the source IPv6 address, and determines the destination scope level of the multicast group by consulting a next-hop table stored in optional memory 214.

Site circuit 206 determines a source site for the source IPv6 address and a destination site for the destination IPv6 address associated with the packet (step 306). Site circuit 206 preferably determines the source site for the source IPv6 address of the packet based on the identity of the logical interface of network device 200 (that is, the port 204, virtual local area network (VLAN), or the like) that received the packet. Site circuit 206 preferably determines the destination site for the destination IPv6 address of the packet based on the identity of the logical interface of network device 200 from which the packet should be transmitted in order to reach that destination IPv6 address, for example by consulting a next-hop table stored in optional memory 214.

Command circuit 210 selects one of a plurality of actions for the packets based on the source site and source scope level associated with the source IPv6 address associated with the packet, and the destination site and destination scope level for each of the destination IPv6 addresses associated with the packet (step 308). Forwarding engine 212 then executes the action selected by command circuit 210 (step 310).

For unicast packets, command circuit 210 preferably selects an action by consulting a command table stored in memory 214 that relates different combinations of the source sites, the source scope levels, the destination sites and the destination scope levels to particular actions. A portion of an example command table is shown in Table 2. Table 2 is presented as an example only. Other configurations are contemplated.

TABLE 2

| Source scope level | Destination scope level | Border Crossing | Command |
|---|---|---|---|
| Global | Global | N/A | Forward |
| Site-local | Global | No | Forward |
| Site-local | Global | Yes | Drop |
| . . . | . . . | . . . | . . . |

The "source scope level" column contains the scope of the source IPv6 address of the packet. The "destination scope level" column contains the scope of the destination IPv6 address of the packet. The "border crossing" column indicates whether the source site and destination site of the packet differ. If so, a border crossing between sites is indicated.

Referring to the second row of Table 2, when the source scope level of the source IPv6 address of the packet is global, command circuit 210 selects the action of forwarding the packet according to its destination IPv6 address.

Referring to the third row of Table 2, when the source scope level of the source IPv6 address of the packet is site-local, the destination scope level of the destination IPv6 address of the packet is global, and no border crossing is indicated, command circuit 210 selects the action of forwarding the packet according to its destination IPv6 address.

Referring to the fourth row of Table 2, when the source scope level of the source IPv6 address of the packet is site-local, the destination scope level of the destination IPv6 address of the packet is global, and a border crossing is indicated, command circuit 210 selects the action of dropping the packet.

Multicast groups of global scope can have members in multiple sites. Therefore, network device 200 must forward packets with global scope source addresses and global scope multicast destination addresses to all members of the multicast group. In addition, network device 200 must forward packets with site-local scope source addresses and global scope multicast destination addresses only to members of the source site.

Figure 4:
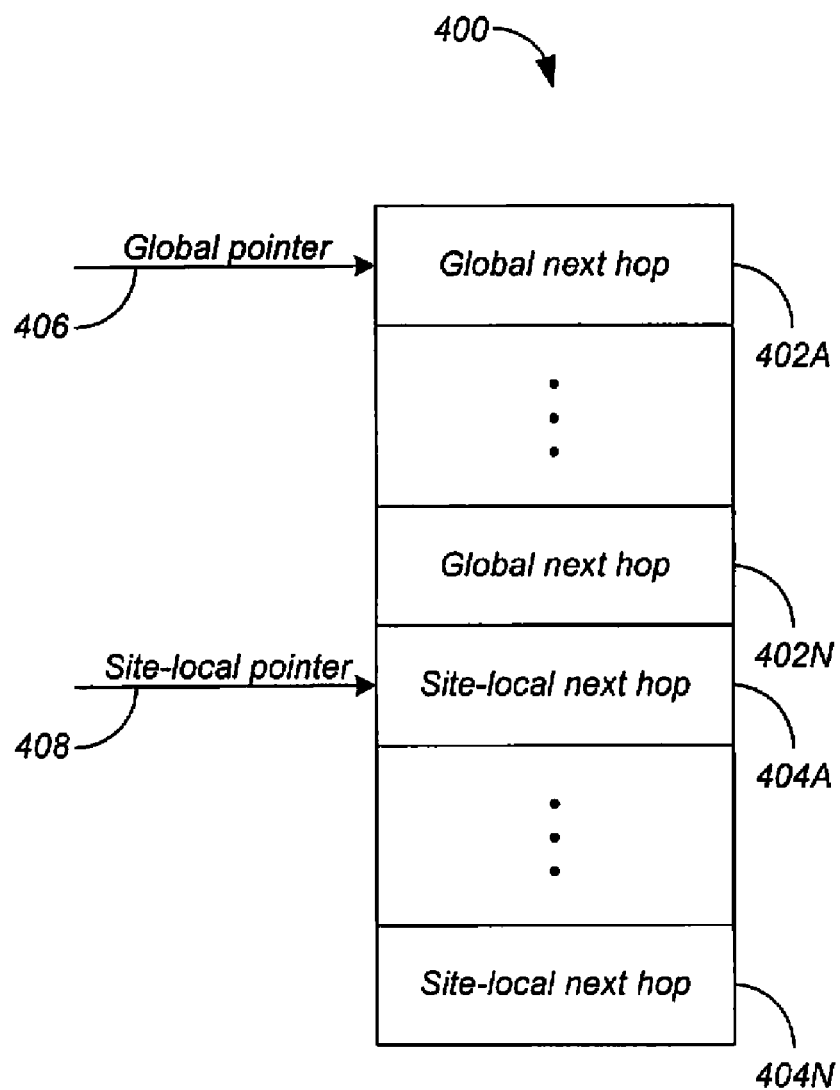
FIG. 4 shows an example linked list according to a preferred embodiment of the present invention.

Preferably memory 214 stores a multicast next-hop table 216 comprising a linked list of next hops for each multicast address. The memory 214 may also store a multicast routing table 218 that includes entries$_{1-M}$, where M is an integer. Each of the entries$_{1-M}$ associates an IPv6 multicast address with a site-local pointer and a global pointer (e.g., multicast addresses$_{1-M}$, site-local pointers$_{1-M}$, and global pointers$_{1-M}$). FIG. 4 shows an example linked list 400 according to a preferred embodiment of the present invention. Linked list 400 includes a next-hop entry for all of the members of the respective multicast group, with the global next hop entries 402A-N followed by the site-local next hop entries 404A-N, and with the last global entry 402N linked to the first site-local entry 404A. For each global multicast address, command circuit 210 uses one of two pointers to access the respective linked list 400: a global pointer 406 that points to the first global entry 402A, or a site-local pointer 408 that points to the first site-local entry 404A. When the source scope of the multicast packet is site-local, the command circuit 210 uses site-local pointer 408, thereby directing the packet only to the site-local members of the multicast group. But when the source scope of the multicast packet is global, the command circuit 210 uses global pointer 406, thereby directing the packet to all of the members of the multicast group.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a plurality of ports, wherein one of the plurality of ports is configured to receive a packet;
a scope circuit configured to determine a source scope level for a source Internet protocol version 6 (IPv6) address of the packet and determine a destination scope level for one of destination IPv6 addresses of the packet based on next-hop entries associated with the destination IPv6 addresses of the packet; and
a command circuit configured to determine whether to forward the packet based at least on the source scope level and the destination scope level,
wherein the source scope level is indicative of whether a source address is a global address or a local address, and
wherein the destination scope level is indicative of whether the one of the destination IPv6 addresses is a global address or a local address.

2. The apparatus of claim 1, further comprising a site circuit configured to determine a source site of the source IPv6 address for the packet,
wherein the command circuit is further configured to determine whether to forward the packet based on the source site, and
wherein the command circuit is configured to determine whether to drop the packet based on the source site and the source scope level.

3. The apparatus of claim 1, wherein:
the packet is a multicast packet;
each of the plurality of ports is configured to receive the multicast packet; and
the command circuit is configured to determine whether to forward the multicast packet based on the source scope level.

4. The apparatus of claim 1, further comprising a site circuit configured to determine a destination site for one of the destination IPv6 addresses of the packet, wherein:
the scope circuit configured to determine a destination scope level for the one of the destination IPv6 addresses of the packet; and
the command circuit configured to determine whether to forward the packet based on the destination site and destination scope level.

5. The apparatus of claim 1, wherein the command circuit is configured to forward the packet to at least one of a router and a host based on the source scope level.

6. The apparatus of claim 1, wherein the command circuit is configured to forward the packet to members of a multicast group based on the source scope level.

7. The apparatus of claim 1, wherein the command circuit is configured to:
forward the packet to only members of a source site of the apparatus when the source scope level is local; and
forward the packet to members of a multicast group when the source scope level is global.

8. The apparatus of claim 1, wherein:
the command circuit is configured to forward the packet to members of a multicast group when the source scope level is global; and
the multicast group includes a member that is of a source site of the apparatus and another member that is not of the source site.

9. The apparatus of claim 1, wherein the command circuit is configured to:
forward the packet to a host of a source site of the apparatus and not to a router of the source site when the source scope level is local; and
forward the packet to the host and to the router when the source scope level is global.

10. The apparatus of claim 1, wherein the command circuit is configured to drop the packet when:
the source scope level for the source IPv6 address of the packet is local;
a destination scope level for a destination IPv6 address of the packet is global; and
a source site for the source IPv6 address of the packet is different than a destination site for a destination IPv6 address of the packet.

11. The apparatus of claim 1, further comprising a memory configured to store a table relating combinations of the source scope levels, source sites, destination sites and destination scope levels including the destination scope level for the unicast destination IPv6 address to a plurality of actions,
wherein the command circuit is configured to select one of the plurality of actions based on the table, and
wherein the table relates each of the source scope levels and each of the destination scope levels to a border crossing status.

12. The apparatus of claim 1, further comprising:
a memory configured to store:
a next-hop table comprising a plurality of linked lists of next-hop entries for packets received via the plurality of ports,
wherein each of the next-hop entries for each of the packets comprises a plurality of global next-hop entries and a plurality of local next-hop entries, and
wherein at least one of the plurality of global next-hop entries is linked to a first one of the local next-hop entries; and
a multicast routing table comprising a plurality of entries, wherein each of the plurality of entries is associated with an IPv6 multicast address.

13. The apparatus of claim 12, wherein the source IPv6 address of each of the plurality of entries comprises:
a local pointer configured to point to the first one of the local next-hop entries in one of the linked lists; and
a global pointer configured to point to a first one of the global next-hop entries in the one of the linked lists,
wherein the command circuit configured to forward selected packets that have source IPv6 addresses according to:
an associated site-local pointer when the source scope for an associated source IPv6 address is local; and
an associated global pointer when the source scope for the associated source IPv6 address is global.

14. The apparatus of claim 1, further comprising a site circuit configured to determine a source site for the source IPv6 address of the packet based on at least one of:
an identity of one of the ports that received the packet; and
a source virtual local area network (VLAN) of the packet.

15. The apparatus of claim 1, further comprising a site circuit configured to determine a destination site for one of the destination IPv6 addresses of the packet based on the next-hop entries associated with the destination IPv6 addresses of the packet.

16. The apparatus of claim 1, wherein:

the source IPv6 address and one of the destination IPv6 addresses of the packet comprise respective prefixes; and the scope circuit is configured to determine the source scope level for the source IPv6 address and the one of the destination IPv6 addresses based on the respective prefixes.

17. The apparatus of claim 1, wherein:

the source IPv6 address and a destination IPv6 address of the packet comprise respective prefixes, and a destination scope level for a unicast destination IPv6 address is determined based on the respective prefixes.

18. The apparatus of claim 17, where the destination scope level for the unicast destination IPv6 address is determined based on the next-hop entries associated with the destination IPv6 addresses of the packet.

19. The apparatus of claim 1, wherein the command circuit is configured to selectively forward drop the packet based on a border crossing status of the packet.

20. A network device comprising:

a plurality of ports, wherein one of the plurality of ports is configured to receive a packet;

a scope circuit configured to determine a source scope level for a source Internet protocol version 6 (IPv6) address of the packet and determine a destination scope level for one of destination IPv6 addresses of the packet based on next-hop entries associated with the destination IPv6 addresses of the packet, wherein the source scope level is indicative of whether a source address is a global address or a local address, and wherein the destination scope level is indicative of whether the one of the destination IPv6 addresses is a global address or a local address; and a command circuit configured to determine whether to forward the packet based at least on the source scope level and the destination scope level and forward the packet to one of members of a multicast group and members of a source site of the network device based at least on the source scope level and the destination scope level.

\* \* \* \* \*